US012646207B2

(12) United States Patent
Hilsenbeck et al.

(10) Patent No.: US 12,646,207 B2
(45) Date of Patent: Jun. 2, 2026

(54) METHOD AND DEVICE FOR PREDICTING OBJECT DATA CONCERNING AN OBJECT

(71) Applicant: Bayerische Motoren Werke Aktiengesellschaft, Munich (DE)

(72) Inventors: Barbara Hilsenbeck, Olching (DE); Alexander Lehner, Munich (DE); Alvaro Marcos-Ramiro, Munich (DE); Johannes Niedermayer, Baldham (DE); Mohammad-Ali Nikouei Mahani, Munich (DE); Michael Schmidt, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 18/288,631

(22) PCT Filed: Mar. 30, 2022

(86) PCT No.: PCT/EP2022/058363
§ 371 (c)(1),
(2) Date: Oct. 27, 2023

(87) PCT Pub. No.: WO2022/228809
PCT Pub. Date: Nov. 3, 2022

(65) Prior Publication Data
US 2024/0212206 A1      Jun. 27, 2024

(30) Foreign Application Priority Data
Apr. 28, 2021      (DE) ..................... 10 2021 110 824.1

(51) Int. Cl.
*G06K 9/00*          (2022.01)
*G06T 7/262*        (2017.01)
*G06T 7/73*          (2017.01)

(52) U.S. Cl.
CPC ................ *G06T 7/74* (2017.01); *G06T 7/262* (2017.01); *G06T 2207/20081* (2013.01); *G06T 2207/20084* (2013.01); *G06T 2207/30248* (2013.01)

(58) Field of Classification Search
CPC . G06T 7/74; G06T 7/262; G06T 2207/20081; G06T 2207/20084; G06T 2207/30248; G06V 10/454; G06V 20/58
See application file for complete search history.

(56) References Cited

U.S. PATENT DOCUMENTS 10,318,827 B2 * 6/2019 Jia ............................. G06N 3/09
10,402,995 B2 * 9/2019 Kwant ..................... G06N 3/08
(Continued)

FOREIGN PATENT DOCUMENTS

CN          108171217 A        6/2018
CN          108803617 A        11/2018
(Continued)

OTHER PUBLICATIONS

Chinese-language Office Action issued in Chinese Application No. 202280031643.5 dated Jul. 10, 2025 with partial English translation (15 pages).
(Continued)

*Primary Examiner* — Shervin K Nakhjavan
(74) *Attorney, Agent, or Firm* — Crowell & Moring LLP

(57) ABSTRACT

A device for determining object data in relation to an object in the environment of at least one image camera is described. The device is configured to determine a camera-based feature tensor on the basis of at least one image from the image camera for a first point in time by means of a neural encoder network. Furthermore, the device is configured to transform and/or project the camera-based feature tensor from an image plane of the image onto a grid plane of an
(Continued)

environment grid of the environment of the image camera in order to determine a transformed feature tensor. The device is furthermore configured to determine object data in relation to the object in the environment of the image camera on the basis of the transformed feature tensor by means of a neural evaluation network, the object data comprising one or more predicted properties of the object at a point in time succeeding the first point in time.

12 Claims, 5 Drawing Sheets

(56) References Cited

U.S. PATENT DOCUMENTS

| | | | | |
|---|---|---|---|---|
| 11,113,584 | B2 * | 9/2021 | Deng | G01S 17/86 |
| 11,195,331 | B2 * | 12/2021 | Lee | G06T 17/30 |
| 11,308,338 | B2 * | 4/2022 | Yang | G01S 15/931 |
| 11,380,108 | B1 * | 7/2022 | Cai | G06V 10/454 |
| 11,551,365 | B2 * | 1/2023 | Murashkin | G05D 1/0248 |
| 11,691,648 | B2 * | 7/2023 | Theverapperuma ... | G06N 3/096 |
| | | | | 701/25 |
| 11,978,181 | B1 * | 5/2024 | Pieper | H04N 23/617 |
| 12,072,442 | B2 * | 8/2024 | Koivisto | G01S 7/417 |
| 12,136,230 | B2 * | 11/2024 | Meier | G06T 7/70 |
| 2020/0175691 | A1 | 6/2020 | Zhang et al. | |
| 2020/0380274 | A1 * | 12/2020 | Shin | G06T 7/292 |
| 2023/0211722 | A1 * | 7/2023 | Li | G06N 7/01 |
| | | | | 315/82 |
| 2024/0029447 | A1 * | 1/2024 | Smolyanskiy | G06V 10/774 |

FOREIGN PATENT DOCUMENTS

| | | | | |
|---|---|---|---|---|
| CN | 111258217 A | | 6/2020 | |
| CN | 112215337 A | * | 1/2021 | ............ G06N 3/048 |

OTHER PUBLICATIONS

International Search Report (PCT/ISA/210) issued in PCT Application No. PCT/EP2022/058363 dated Aug. 5, 2022 with English translation (4 pages).

German-language Written Opinion (PCT/ISA/237) issued in PCT Application No. PCT/EP2022/058363 dated Aug. 5, 2022 with English translation (10 pages).

German-language Search Report issued in German Application No. 10 2021 110 824.1 dated Apr. 19, 2022 with partial English translation (13 pages).

S. Daga et al.; "BirdSLAM: Monocular Multibody SLAM in Bird's-Eye View", ARXIV.org, Cornell University Library, 201 Olin Library Cornell University, Ithaca, NY 14853, Nov. 15, 2020, XP 08181487 (11 pages).

T. Roddick et al.; "Orthographic Feature Transform for Monocular 3D Object Detection", ARXIV.org, Cornell University Library, 201 Olin Library Cornell University, Ithaca, NY 14853, Nov. 20, 2018, pages, XP 081052453 (10 pages).

A. Hu et al.; "FIERY: Future Instance Prediction in Bird's-Eye View from Surround Monocular Cameras", 2021 IEEE/CVF International Conference on Computer Vision (ICCV), Apr. 21, 2021, pp. 15235-15262, XP 055946513 (15 pages).

L. Hoyer et al.; "Short-Term Prediction and Multi-Camera Fusion on Semantic Grids", IEEE/CVF International Conference on Computer Vision Workshop, 2019 (9 pages).

N. Hendy et al.; "FISHING Net: Future Inference of Semantic Heatmaps In Grinds", 2020 (9 pages).

\* cited by examiner

500 determining a camera-based feature tensor on the
basis of an image of an image camera     501 transforming the camera-based feature tensor
into a transformed feature tensor     502 predicting object data on the basis of
the transformed feature tensor     503

METHOD AND DEVICE FOR PREDICTING OBJECT DATA CONCERNING AN OBJECT

BACKGROUND AND SUMMARY

The invention relates to a method and a corresponding device which enable a vehicle to determine, for example, on the basis of image data from one or more cameras, a prediction of object data with respect to one or more objects in the surroundings of the one or more cameras.

A vehicle typically comprises a plurality of different surroundings sensors, which are configured to acquire different sensor data with respect to the surroundings of the vehicle. Exemplary surroundings sensors are lidar sensors, image sensors or image cameras, radar sensors, ultrasonic sensors, etc. One or more surroundings objects (for example, one or more other vehicles) in the surroundings of the vehicle can be detected and possibly tracked on the basis of the sensor data of the one or more surroundings sensors of the vehicle.

The present document relates to the technical problem of enabling particularly reliable and/or precise tracking of one or more objects on the basis of image data from one or more image cameras.

The object is achieved by each of the independent claims. Advantageous embodiments are described in the dependent claims. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a device for determining object data with respect to (at least) one object in the surroundings of at least one image camera is described. Exemplary objects are obstacles and/or other road users in the surroundings of a vehicle. The image camera can be designed to acquire images, in particular a time sequence of images, with respect to the surroundings in front of the image camera. The individual images can be arranged in a (two-dimensional, 2D) image plane. In particular, the individual images can include pixels, such as a matrix of pixels, in a specific image plane.

The image camera can be installed in a vehicle (for example, as a front camera of the vehicle). The vehicle can be designed to move on a roadway. The image plane of the image camera can be arranged (possibly essentially or at least partially) perpendicular to the roadway.

The device is configured to determine a camera-based feature tensor on the basis of at least one image of the image camera for a first point in time by means of a neural encoder network (for example by means of a convolutional neural network trained beforehand). The camera-based feature tensor can comprise one or more features within the image plane of the image camera. A feature tensor described in this document can include two or more dimensions. In a special case, a feature tensor can be or comprise a feature matrix. For example, a feature tensor can include multiple planes of feature matrices. In such a case, the feature tensor can be three-dimensional. Each plane can include a different type of feature in this case.

The device is furthermore configured to transform and/or project the camera-based feature tensor from the image plane of the image to a grid plane of a surroundings grid of the surroundings of the image camera, in order to determine a transformed feature tensor (having one or more features in the grid plane). The grid plane can be arranged in parallel to the roadway. The grid plane can correspond to a bird's eye view (BEV) of the surroundings. The camera-based feature tensor can be transformed and/or projected by means of a transformation, which is time invariant and/or defined beforehand, from the image plane of the image to the grid plane of the surroundings grid of the surroundings of the image camera. An exemplary transformation is described in Roddick, Thomas, Alex Kendall, and Roberto Cipolla, "Orthographic feature transform for monocular 3d object detection", British Machine Vision Conference (2019). The transformation is designated in this document as "orthographic feature transform". The content of this document is incorporated by reference in the present description.

Furthermore, the device is configured to determine object data with respect to the object in the surroundings of the image camera on the basis of the transformed feature tensor by means of a neural evaluation network. The object data can comprise one or more predicted properties of the object at a point in time subsequent to the first point in time here. The first point in time can be, for example, a point in time n and the subsequent point in time can be a point in time n+1. The device can be configured to determine the object data repeatedly, in particular periodically, for a sequence of points in time n, n+1, n+2, etc.

The one or more predicted properties of the object can comprise the position and/or the orientation of the object, in particular the position and/or the orientation within the surroundings grid, at the subsequent point in time. Alternatively or additionally, the one or more predicted properties of the object can comprise one or more cells of the surroundings grid which are occupied at the subsequent point in time by the object (in order to thus describe the position and/or the orientation of the object). Alternatively or additionally, the one or more predicted properties of the object can comprise an occupancy probability and/or an evidence mass of the object at the subsequent point in time for one or more cells of the surroundings grid.

A device is therefore described which enables, by using a neural encoder network, a (fixed) transformation, and a neural evaluation network, (three-dimensional, 3D) object data to be predicted with respect to one or more objects on the bird's eye plane on the basis of images of an image camera in a precise and robust manner. In particular a prediction of the 3D position and/or the 3D orientation of an object at a subsequent point in time n+1 can take place here within the bird's eye view plane (and not (only) in the image plane). The prediction can possibly be made here solely on the basis of the images from one or more cameras. The predicted object data (in particular the predicted positions and/or orientations) can then be used for reliable and robust tracking of the one or more objects.

The neural encoder network and the neural evaluation network were typically trained beforehand on the basis of labeled training data, wherein the training data comprise a plurality of training data sets. The individual training data sets can each include a training image of the image camera having one or more training objects (represented therein) for a training point in time and object data having one or more actual properties of the one or more training objects for a point in time subsequent to the respective training point in time.

The individual parameters of the networks can have been trained using a learning method and an error function on the basis of the training data. The device can be used here to determine one or more predicted properties of the one or more training objects for a training data set, which are then compared to the one or more actual properties from the training data set in order to determine the error function. The error function can then be used to adjust the individual parameters of the neural networks of the device, in order to thus gradually increase the quality of the device in the determination of the object data.

The device can be configured to combine a plurality of chronologically successive images of the image camera to form an overall image for the first point in time, in particular to superimpose or concatenate them. The plurality of chronologically successive images can have been acquired before or at latest at the first point in time by the image camera. A time sequence of images of the image camera can thus be observed and combined. The camera-based feature tensor can then be determined on the basis of the overall image by means of the neural encoder network. The one or more predicted properties of an object (represented in an image) can be determined with increased accuracy by the observation of a time sequence of images (in particular with respect to depth information perpendicular to the image plane of the image camera).

Alternatively or additionally, the device can be configured to determine a corresponding plurality of camera-based feature tensors for a plurality of chronologically successive images of the image camera by means of the neural encoder network. The plurality of chronologically successive images can cover an acquisition period of time here, which extends chronologically before and/or up to the first point in time. The individual images of a time sequence of images can thus be analyzed individually, in order to determine in each case a camera-based feature tensor having features in the image plane of the image camera.

The device can furthermore be configured to determine a corresponding plurality of transformed feature tensors on the basis of the plurality of camera-based feature tensors. The above-mentioned transformation can be used in each case for this purpose.

Furthermore, the device can be configured to determine odometry data with respect to a movement of the image camera during the acquisition period of time. As already described above, the image camera can be installed in a vehicle. The movement of the image camera can then correspond to the movement of the vehicle and odometry data with respect to the movement of the vehicle can be determined, e.g., on the basis of a wheel sensor, an inertial measuring unit, a velocity sensor, an acceleration sensor, etc.

The plurality of transformed feature tensors can then be combined, in particular fused, in consideration of the odometry data, in order to determine a combined, transformed feature tensor. Corresponding features in the individual transformed feature tensors can be identified (and fused) here on the basis of the odometry data. The object data with respect to the object in the surroundings of the image camera can then be determined in a particularly precise manner on the basis of the combined transformed feature tensor by means of the neural evaluation network.

The device can be configured to determine, on the basis of at least one image of the image camera for the subsequent point in time, one or more updated properties of the object, corresponding to the one or more predicted properties, at the subsequent point of time. The object can then be tracked in a precise and robust manner on the basis of the one or more predicted properties and on the basis of the one or more updated properties, in particular on the basis of a comparison of the one or more updated properties to the corresponding one or more predicted properties, at successive points in time.

The device can be configured, on the basis of grid-based sensor data from one or more surroundings sensors (such as a lidar sensor and/or a radar sensor), to determine a grid-based feature tensor for the first point in time by means of a further neural encoder network. Therefore, the sensor data of one or more surroundings sensors can be used, which are designed to sense information with respect to the object directly within the grid plane.

A fused feature tensor can then be determined on the basis of the transformed feature tensor and on the basis of the grid-based feature tensor, in particular by concatenation and/or by addition. The object data with respect to the object in the surroundings of the image camera can then be determined in a particularly precise and robust manner on the basis of the fused feature tensor by means of the neural evaluation network.

According to a further aspect, a (road) motor vehicle (in particular a passenger vehicle or a truck or a bus or a motorcycle) is described, which comprises the device described in this document.

According to a further aspect, a method for determining object data with respect to an object in the surroundings of at least one image camera is described. The method comprises determining, by means of a neural encoder network, a camera-based feature tensor on the basis of at least one image of the image camera for a first point in time. Furthermore, the method comprises transforming and/or projecting the camera-based feature tensor from an image plane of the image to a grid plane of a surroundings grid of the surroundings of the image camera to determine a transformed feature tensor. The method furthermore comprises determining, by means of a neural evaluation network, object data with respect to the object in the surroundings of the image camera on the basis of the transformed feature tensor. The object data can comprise one or more predicted properties of the object at a point in time subsequent to the first point in time here.

According to a further aspect, a software (SW) program is described. The SW program can be configured to be executed on a processor (for example on a control unit of a vehicle), and to thus carry out the method described in this document.

According to a further aspect, a storage medium is described. The storage medium can comprise a SW program, which is configured to be executed on a processor, and to thus carry out the method described in this document.

It is to be noted that the methods, devices, and systems described in this document can be used both alone and in combination with other methods, devices, and systems described in this document. Furthermore, any aspects of the methods, devices, and systems described in this document can be combined in various ways with one another. In particular, the features of the claims can be combined with one another in various ways.

The invention will be described in more detail hereinafter on the basis of exemplary embodiments.

DETAILED DESCRIPTION OF THE DRAWINGS

Figure 1:
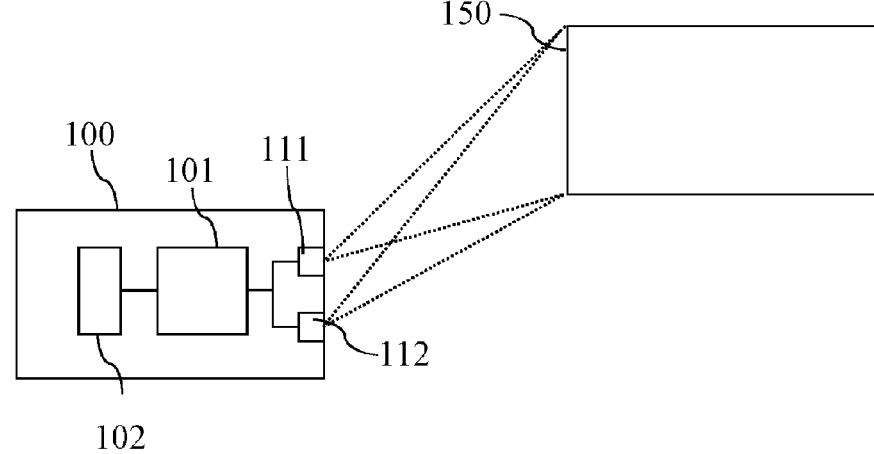
FIG. 1 shows an exemplary vehicle having one or more surroundings sensors.

As described at the outset, the present document relates to the reliable and precise detection and/or tracking of objects on the basis of the sensory data of one or more surroundings sensors. In this context, FIG. 1 shows a vehicle 100 having one or more surroundings sensors 111, 112 for acquiring sensor data. Exemplary surroundings sensors 111, 112 are one or more lidar sensors, one or more radar sensors, one or more image cameras, etc.

The vehicle 100 comprises a device (or processing unit) 101, which is configured to detect and track an object 150 in the surroundings of the vehicle 100 on the basis of the sensor data. A detected object 150, in particular object data with respect to an object 150, can be taken into consideration in a driving function 102 (for example, for the semiautomated or highly automated driving of the vehicle 100).

Figure 2:
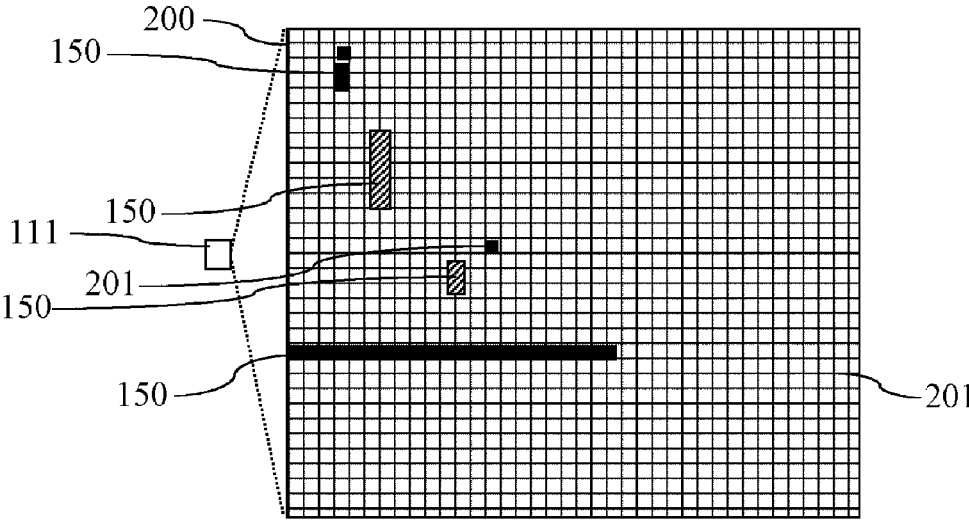
FIG. 2 shows an exemplary surroundings grid with respect to the surroundings or an environment of a vehicle.

The local surroundings of a vehicle 100 can be assessed or represented as an occupancy grid map or (occupancy) grid 200 (see FIG. 2). FIG. 2 shows an exemplary grid 200 of the surroundings or an environment of the vehicle 100 having a plurality of grid cells or cells 201 in short. The grid 200 can divide the surroundings or the environment of the vehicle 100 into the plurality of two-dimensional (2D) or three-dimensional (3D) cells 201. A two-dimensional cell 201 can have a rectangular shape here (for example, having an edge length of 10 cm, 5 cm, 2 cm, 1 cm, or less).

The processing unit 101 of the vehicle 100 can be configured to determine, on the basis of the sensor data for one or more of the cells 201 (in particular for each cell 201), data which indicate whether a cell 201 is occupied or not at a specific point in time t. In particular, the data for a cell 201 can indicate:

$$Z_c = (m(0), m(F)),$$

wherein m({0}) is an evidence or an evidence mass that the cell c 201 is occupied by an object 150 (for example a static or a dynamic object), and wherein m(F) is an evidence that the cell c 201 is free, and is thus not occupied by an object 150. The evidence that the cell 201 is occupied by an object 150 can be considered to be an object probability that the cell 201 is occupied by an object 150 (in particular in the meaning of the Dempster-Shafer theory).

A grid 200 having a plurality of cells 201 can thus be determined on the basis of the sensor data from one or more surroundings sensors 111, wherein the individual cells 201 can indicate information or data about:

whether the respective cell 201 is occupied by an object or not; and/or whether the respective cell 201 is occupied by a dynamic or by a static object; and/or how tall an object in the respective cell 201 is.

The grid 200 can be determined in particular on the basis of the sensor data of a lidar sensor and/or a radar sensor 111. The data of a (surroundings) grid 200 can also be designated as bird's eye view (BEV) data with respect to the surroundings, since the grid 200 describes the surroundings in a top view.

Figure 3A:
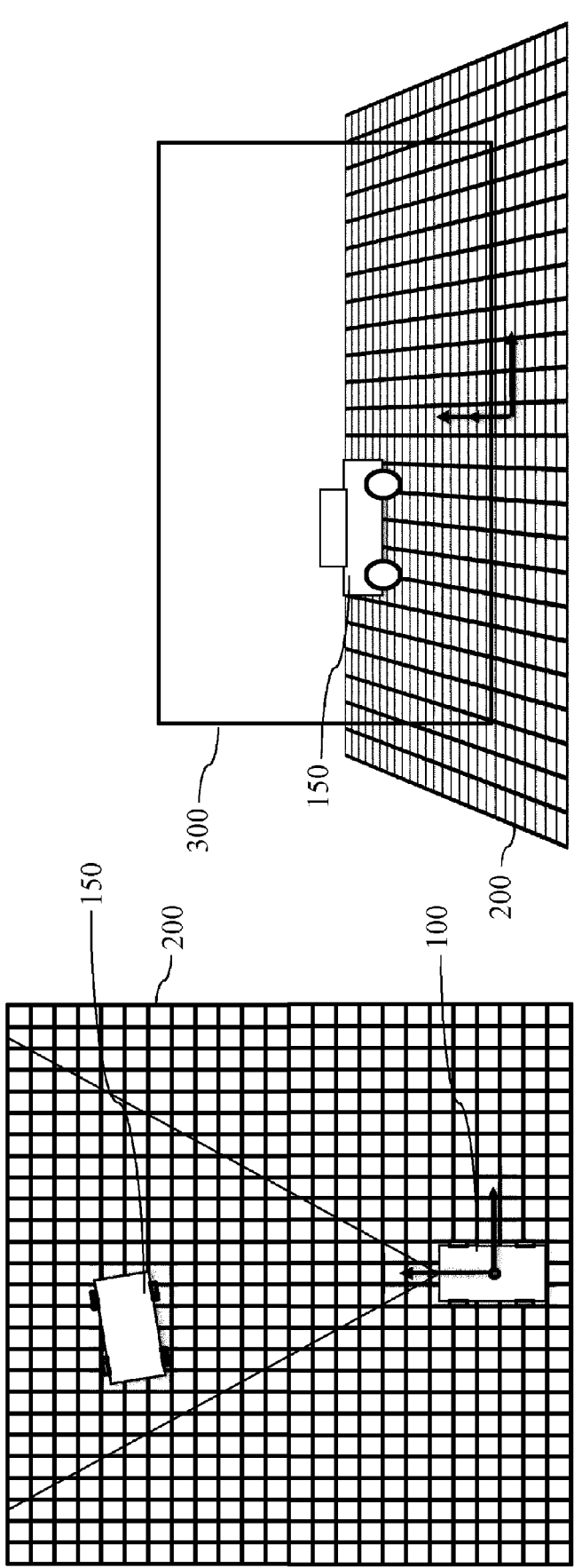
FIG. 3*a* shows exemplary input data which can be used for identifying and/or tracking an object.

As already described above, a vehicle 100 can include different types of surroundings sensors 111, 112. In particular, a vehicle 100 can comprise one or more surroundings sensors 111 (such as a lidar sensor and/or a radar sensor), using which data can be determined directly for a BEV surroundings grid 200 (as shown by way of example in FIG. 3*a*). Furthermore, a vehicle 100 can comprise one or more surroundings sensors 112 (in particular one or more cameras), using which two-dimensional (2D) images 300 of the surroundings can be acquired. The images 300 have a perspective of the surroundings here which deviates from the perspective of the BEV surroundings grid 200 (as shown in FIG. 3*a*, right side).

Figure 3B:
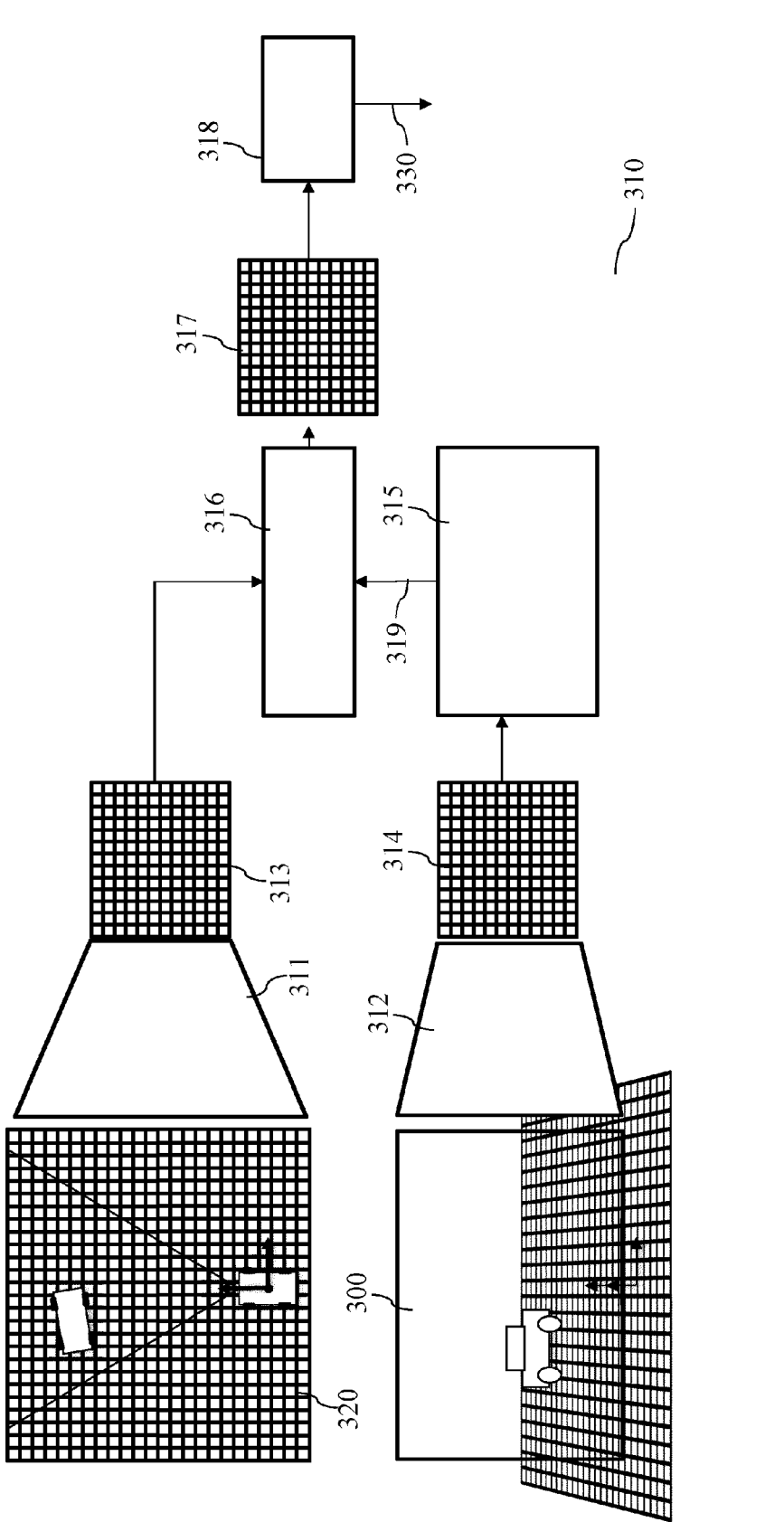
FIG. 3*b* shows an exemplary device for identifying and/or tracking an object on the basis of image data.

FIG. 3*b* shows an exemplary detection and/or prediction device 310, which is configured to fuse the sensor data and/or the information from the different types of surroundings sensors 111, 112, in order to determine object data 330 with respect to one or more objects 150 with increased accuracy, in particular to predict them for a future point in time.

The device 310 comprises a first neural encoder network 311, which is configured to determine a first (grid-based) feature tensor 313 on the basis of the sensor data 320 of a surroundings sensor 111 (which are provided within the surroundings grid 200). Furthermore, the device 310 comprises one or more second neural encoder networks 312, which are each configured to determine a second (camera-based) feature tensor 314 on the basis of the one or more images 300 from one or more cameras 112.

The one or more second (camera-based) feature tensors 314 can be projected by means of a transformation 315 on the grid 200 in order to provide one or more corresponding transformed feature tensors 319. An exemplary transformation 315 is described in Roddick, Thomas, Alex Kendall, and Roberto Cipolla, "Orthographic feature transform for monocular 3d object detection", arXiv preprint arXiv: 1811.08188 (2018) or British Machine Vision Conference (2019). The content of this document is incorporated by reference in the present description.

The first (grid-based) feature tensor 313 can then be fused in a fusion unit 316 with the one or more transformed feature tensors 319, for example, by concatenation and/or by addition, to provide a fused feature tensor 317. The object data 330 for one or more objects 150 can then be determined by means of an evaluation network 318 on the basis of the fused feature tensor 317.

The neural networks 311, 312, 318 of the device 310 can be trained on the basis of labeled training data and possibly using the back propagation algorithm.

In the device 310 shown in FIG. 3*b*, the processing of grid-based surroundings data 320, such as data of a lidar sensor and/or radar sensor 111, is optional. The device 310 can be configured to determine object data 330 with respect to one or more objects 150 solely on the basis of camera-based data 300.

The object data 330 determined by the device 310 can comprise a prediction or a forecast of one or more properties of an already detected object 150. The one or more properties can be predicted here for a subsequent point in time from a sequence of points in time. The device 310 can be configured to determine respective current object data 330 repeatedly, in particular periodically, on the basis of current input data 300, 320. For example, object data 330 can thus be determined in each case for a sequence of points in time n. The device 310 can be configured to predict, on the basis of the input data 300, 320 for a point in time n, one or more properties of an object 150 at a subsequent point in time n+1. The one or more predictive properties can then be used for tracking of the object 150.

Exemplary properties of an object 150 are:

the position (of a reference point) of the object 150;

an alignment or orientation of the object 150;

one or more cells 201 occupied by the object 150; and/or an occupancy probability and/or an evidence mass of one or more cells 201 with respect to the occupancy by the object 150.

The object data 330 can in particular comprise an occupancy grid 200, predicted on the basis of the input data 300, 320 for the point in time n, for the subsequent point in time n+1. Furthermore, the object data 330 can indicate an association between occupied grid cells 201 and individual objects 150. The occupancy grid 200 predicted for the subsequent point in time n+1 can then be superimposed with an occupancy grid 200 determined on the basis of the input data 300, 320 for the subsequent point in time n+1 in order to enable particularly precise and robust tracking of detected objects 150. In particular, the association of the individual grid cells 201 with the individual objects 150 known from the predicted occupancy grid 200 can be used in the occupancy grid 200 determined for the subsequent point in time n+1 to be able to locate the individual objects 150 therein.

Figure 4:
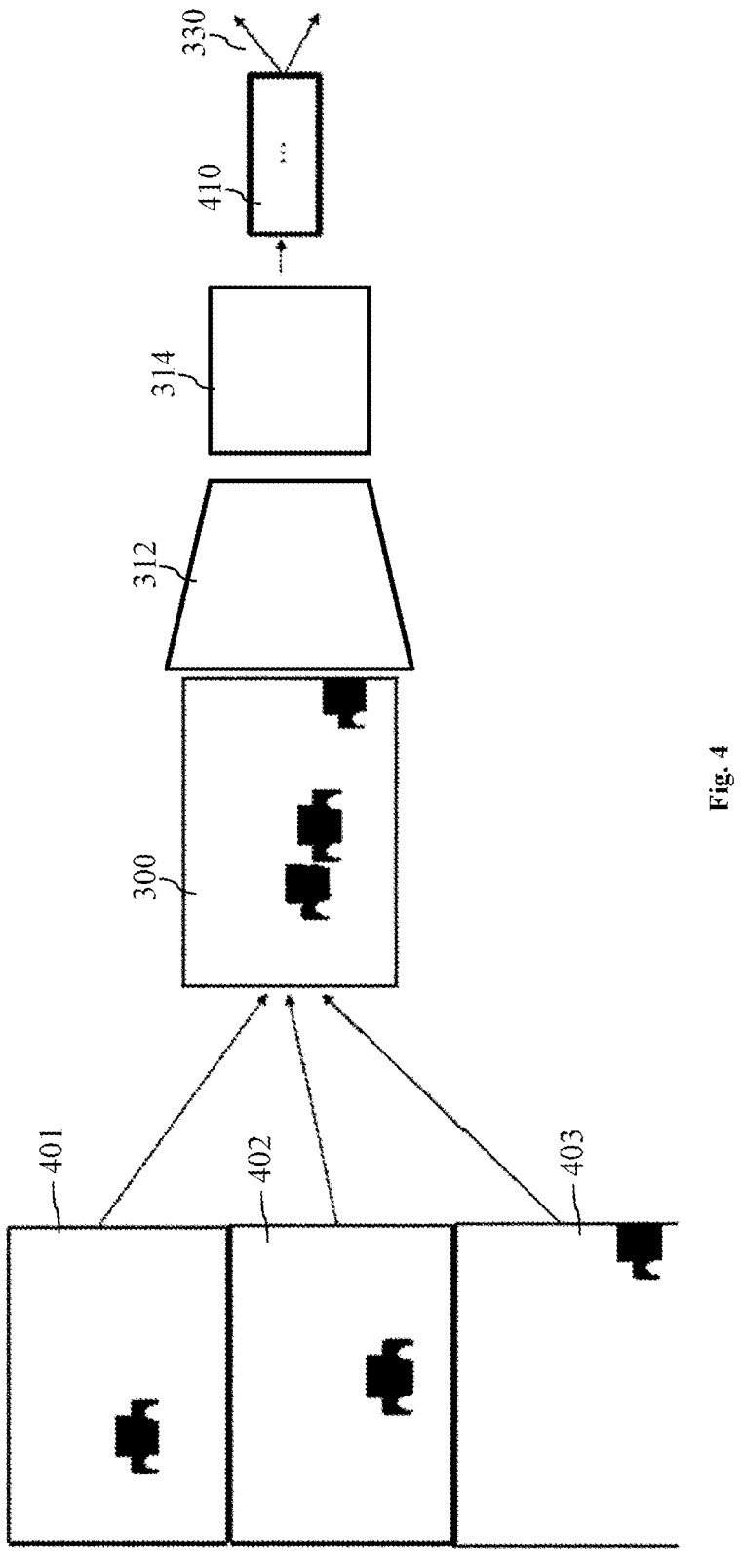
FIG. 4 shows an exemplary consideration of a sequence of images in the tracking of an object.

The camera-based input data 300, as shown by way of example in FIG. 4, include a time sequence of images 401, 402, 403 of a camera 112. The time sequence of images 401, 402, 403 can be superimposed and/or concatenated in order to determine a camera-based feature tensor 314 on the basis of a (neural) encoder network 312. On the basis of a processing module 410, which comprises, for example, the transformation unit 316 and the evaluation network 318, the object data 330 can then be determined with increased accuracy.

Alternatively or additionally, a camera-based feature tensor 314 can be determined for each of the individual images 401, 402, 403 on the basis of the encoder network 312. The individual camera-based feature tensor 314 can then each be transformed in the transformation unit 315 into a transformed feature tensor 319.

The individual transformed feature tensors 319 each display corresponding features which, however, due to a movement of the image camera 112, in particular of the vehicle 100, can be arranged at different positions within the grid 200. A precise assignment of corresponding features in the individual transformed feature tensors 319 can be carried out on the basis of odometry data with respect to the movement of the image camera 112, in particular of the vehicle 100, in order to fuse the transformed feature tensors 319 and to determine the object data 330 with increased accuracy based thereon.

Figure 5:
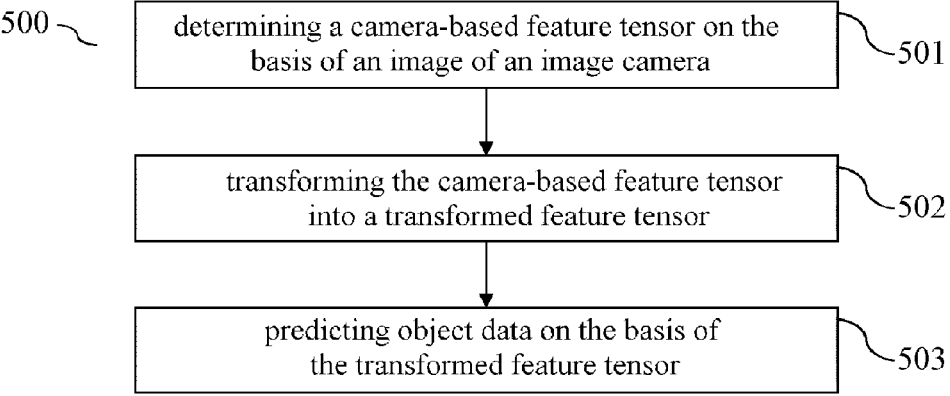
FIG. 5 shows a flow chart of an exemplary method for predicting object data with respect to an object on the basis of image data.

FIG. 5 shows a flow chart of an exemplary (possibly computer-implemented) method 500 for determining object data 330 with respect to one or more objects 150 in the surroundings of one or more image cameras 112. The one or more image cameras 112 can be arranged in a vehicle 100. The method 500 can be carried out by a control unit 101 of the vehicle 100.

The method 500 comprises determining 501, by means of a neural encoder network 312, a camera-based feature tensor

314 on the basis of at least one image 300 from at least one image camera 112 for a first point in time. The encoder network 312 can comprise a convolutional neural network (CNN). The image 300 can display the surroundings of the image camera 112 on a 2D image plane. Furthermore, the camera-based feature tensor 314 can indicate features in a 2D plane (which corresponds to the 2D image plane).

Furthermore, the method 500 comprises transforming and/or projecting 502 the camera-based feature tensor 314 (by means of a predefined and/or fixed transformation) from the (2D) image plane of the image 300 to the grid plane of a surroundings grid 200 of the surroundings of the image camera 112 to determine a transformed feature tensor 319. The grid plan can correspond here to the plane of a BEV of the surroundings in front of the image camera 112. The above-mentioned transformation can be used as the transformation. The transformation can be dependent here (possibly solely) on the geometric arrangement of the image plane and the grid plane in relation to one another.

The method 500 furthermore comprises determining 503, by means of a neural evaluation network 318, object data 330 with respect to the object 150 in the surroundings of the image camera 112 on the basis of the transformed feature tensor 319. The object data 330 can comprise one or more predicted properties of the object 150 at a point in time subsequent to the first point in time here. A prediction of one or more properties of an object 150 represented in the image 300 in the future can thus take place. Particularly precise and robust tracking of the object 150 can thus be enabled.

The present invention is not restricted to the exemplary embodiments shown. In particular, it is to be noted that the description and the figures are only to illustrate the principle of the proposed methods, devices, and systems by way of example.

The invention claimed is:

1. A device for determining object data with respect to an object in surroundings of at least one image camera, comprising:

a processor operatively configured to:

determine a camera-based feature tensor based on at least one image of the image camera for a first point in time via a neural encoder network;

transform and/or project the camera-based feature tensor from an image plane of the image to a grid plane of a surroundings grid of the surroundings of the image camera to determine a transformed feature tensor; and determine object data with respect to the object in the surroundings of the image camera based on the transformed feature tensor via a neural evaluation network, wherein the object data comprise one or more predicted properties of the object at a point in time subsequent to the first point in time;

wherein the processor is further configured to:

combine a plurality of chronologically successive images of the image camera to form an overall image for the first point in time, wherein the plurality of chronologically successive images were acquired before or at latest at the first point in time by the image camera; and determine the camera-based feature tensor based on the overall image via the neural encoder network.

2. The device according to claim 1, wherein the one or more predicted properties of the object comprise a position and/or an orientation of the object at the subsequent point in time.

3. The device according to claim 2, wherein
the position and/or orientation is within the surroundings grid.

4. The device according to claim 1, wherein the one or more predicted properties of the object comprise:
one or more cells of the surroundings grid, which are occupied by the object at the subsequent point in time; and/or
an occupancy probability and/or an evidence mass of the object at the subsequent point in time for one or more cells of the surroundings grid.

5. The device according to claim 1, wherein
the camera-based feature tensor is transformed and/or projected via a transformation, which is chronologically invariant and/or defined beforehand, from the image plane of the image to the grid plane of the surroundings grid of the surroundings of the image camera.

6. The device according to claim 1, wherein
the neural encoder network and the neural evaluation network are pre-trained based on labeled training data;
the training data comprise a plurality of training data sets; and
a training data set includes, in each case, a training image of the image camera having one or more training objects for a training point in time and object data having one or more actual properties of the one or more training objects for a point in time subsequent to the training point in time.

7. The device according to claim 1, wherein the successive images are combined by being superimposed or concatenated.

8. The device according to claim 1, wherein the processor is further configured to:
on the basis of at least one image of the image camera for the subsequent point in time, determine one or more updated properties of the object, corresponding to the one or more predicted properties, at the subsequent point in time; and
track the object based on the one or more predicted properties and based on the one or more updated properties at successive points in time.

9. The device according to claim 8, wherein the tracking is on the basis of a comparison of the one or more updated properties to the corresponding one or more predicted properties.

10. The device according to claim 1, wherein the processor is further configured to:
on the basis of grid-based sensor data from one or more surroundings sensors for the first point in time, determine a grid-based feature tensor via a further neural encoder network;
on the basis of the transformed feature tensor and on the basis of the grid-based feature tensor, by concatenation and/or by addition, determine a fused feature tensor; and
determine the object data with respect to the object in the surroundings of the image camera based on the fused feature tensor via the neural evaluation network.

11. A device for determining object data with respect to an object in surroundings of at least one image camera, comprising:
a processor operatively configured to:

determine a camera-based feature tensor based on at least one image of the image camera for a first point in time via a neural encoder network;
transform and/or project the camera-based feature tensor from an image plane of the image to a grid plane of a surroundings grid of the surroundings of the image camera to determine a transformed feature tensor; and
determine object data with respect to the object in the surroundings of the image camera based on the transformed feature tensor via a neural evaluation network,
wherein the object data comprise one or more predicted properties of the object at a point in time subsequent to the first point in time;
wherein the processor is further configured to:
for a plurality of chronologically successive images of the image camera, determine a corresponding plurality of camera-based feature tensors via the neural encoder network; wherein the plurality of chronologically successive images covers an acquisition period of time which extends chronologically before and/or up to the first point in time;
on the basis of the plurality of camera-based feature tensors, determine a corresponding plurality of transformed feature tensors;
determine odometry data with respect to a movement of the image camera during the acquisition period of time;
combine the plurality of transformed feature tensors in consideration of the odometry data, in order to determine a combined transformed feature tensor; and
determine the object data with respect to the object in the surroundings of the image camera on the basis of the combined transformed feature tensor via the neural evaluation network.

12. A method for determining object data with respect to an object in surroundings of at least one image camera, the method comprising:
determining, via a neural encoder network, a camera-based feature tensor based on at least one image of the image camera for a first point in time;
transforming and/or projecting the camera-based feature tensor from an image plane of the image to a grid plane of a surroundings grid of the surroundings of the image camera to determine a transformed feature tensor; and
determining, via a neural evaluation network, object data with respect to the object in the surroundings of the image camera on the basis of the transformed feature tensor; wherein the object data comprise one or more predicted properties of the object at a point in time subsequent to the first point in time,
wherein determining the camera-based feature tenor comprises:
combining a plurality of chronologically successive images of the at least one image camera to form an overall image for the first point in time, wherein the plurality of chronologically successive images were acquired before or at latest at the first point in time by the image camera; and
determining the camera-based feature tensor based on the overall image via the neural encoder network.

* * * * *